UNITED STATES PATENT OFFICE.

WILHELM HERZBERG, OF BERLIN-WILMERSDORF, AND HEINRICH OHLENDORF, OF BERLIN-FRIEDENAU, GERMANY, ASSIGNORS TO I. G. FARBENINDUSTRIE AKTIEN-GESELLSCHAFT, OF FRANKFORT-ON-THE-MAIN, GERMANY.

DYEING.

No Drawing. Application filed October 4, 1926, Serial No. 139,549, and in Germany June 9, 1925.

The present invention relates to a new process of producing dyeings and consists in combining diazo compounds on the fibre with hydroxy-para-diazine derivatives including their hydrocompounds.

The hydroxy-para-diazines in question are substitution products of the para-diazine:

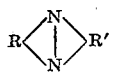

R and R' being radicles of the group including benzene and naphthalene. The hydroxy compounds may be for instance obtained by the process described in German specification 394,195.

In order to put the invention into practice the hydroxy-para-diazine derivatives are dissolved in an alkaline medium, such as a solution of sodium hydroxide or sodium carbonate. For preparing the solution to be employed in dyeing a reducing agent, such as glucose, dextrine, sodium hydrosulphite, may be added, this addition of a reducing agent giving rise to the formation of hydroazine compounds. The fibre is treated in succession with such a solution and with a liquid containing a diazo compound. If the treatment is carried out by printing a thickening agent may be added as usual.

*Example 1.*—Cotton is padded with a solution in dilute caustic soda solution of the hydroxy-para-diazine derivative which may be obtained by melting with an alkali metal hydroxide 4.8 - disulpho - 1.2-naphthophenazine:

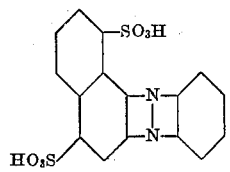

(obtainable from 1.2-naphthoquinone-4.8-disulphonic acid and 1.2-diaminobenzene) or 4 - hydroxy - 8 - sulpho-1.2-naphthophenazine:

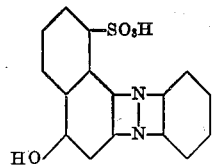

(obtainable from 4-hydroxy-1.2-naphthoquinone-8-sulphonic acid and 1.2-diaminobenzene). The goods are then introduced into a developing bath containing a diazo compound. With 4-nitrodiazobenzene there is obtained a full yellow. Double diazotized dianisidine yields a violet brown. The dyeings are characterized by excellent fastness to light, washing, bowking and chlorine.

*Example 2.*—To the alkaline solution used in Example 1 a quantity of sodium hydrosulphite is added equivalent to the quantity of the hydroxyazine compound. The fibre absorbs more intensively the azine derivative. The fibre padded and exposed to air is then treated as usual with diazo compounds, full and fast dyeings being obtained.

*Example 3.*—The fibre is impregnated with a solution of 6-hydroxynaphthophenazine:

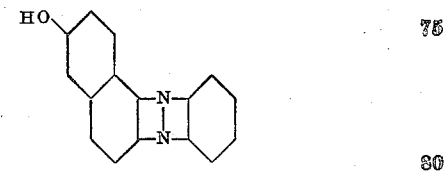

in a dilute sodium hydroxide solution. The fibre is then introduced into a bath containing a diazo compound. Diazotized 4-nitraniline gives an orange, twice diazotized dianisidine a dark brown. The dyeings are fast to chlorine and to bowking.

*Example 4.*—To the alkaline solution used in example 3 prepared from 6-hydroxynaphthophenazine, which may be obtained by melting with an alkali metal hydroxide 6-sulpho-1.2-naphthophenazine, sodium hydrosulphite is added somewhat more than sufficient to transform the azine into its hydrocompound. The fibre is padded with the solution, exposed to air, rinsed and treated with a diazo compound.

*Example 5.*—The fibre to be dyed is impregnated with an alkaline solution of 4-hydroxy-1.2-naphthophenazine:

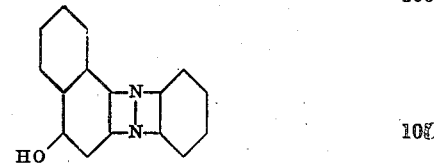

(obtainable from 4-hydroxy-1.2-naphthoquinone and 1.2-diaminobenzene). The fibre thus prepared is dyed a fast clear reddish yellow by 5-nitro-2 diazo-1 methoxybenzene. If double-diazotized dianisidine is employed a violet is obtained.

Example 6.—To the alkaline solution used in Example 5 glucose (in the same quantity as the azine derivative) is added. The fibre impregnated with the solution is exposed to air, rinsed and treated with a diazo compound as stated above.

Example 7.—The fibre is padded with a compound obtainable by alkaline fusion of 3.8-disulpho-1.2-naphthophenazine:

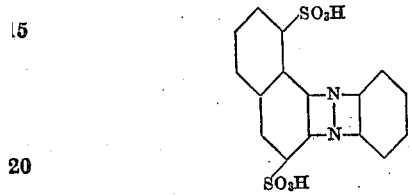

By developing with 5-nitro-2-diazo-1-methoxybenzene there is obtained a corinth color, fast to light, chlorine, washing and bowking.

Example 8.—The fibre is treated with an alkaline solution of 4-hydroxy-1.2-naphtho-2.3-anthraquinone azine:

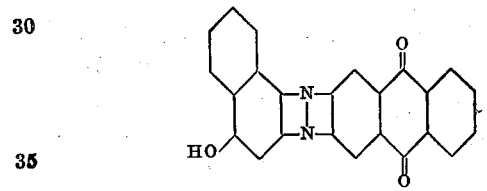

(obtainable by condensing 4-hydroxy-1.2-naphthoquinone with 2.3-diaminoanthraquinone). On development with 5-nitro-2-diazo-1-methoxybenzene a red brown dyeing is obtained, double-diazotized dianisidine gives a corinth.

Example 9.—Wool is impregnated with a solution in water, prepared by addition of sodium carbonate and a fibre protecting substance (protectol), of the hydroxy-para-diazine compound obtained by the alkaline fusion of 1.2.2'.1'-dinaphtazin-3.8.6'-trisulphonic acid:

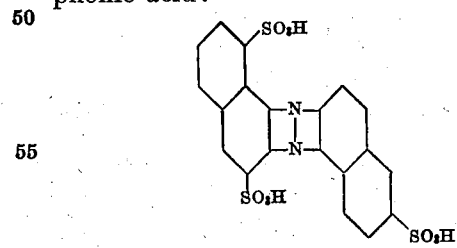

(obtainable by condensing 1.2-naphthoquinone-3.8-disulphonic acid with 1.2-diaminonaphthalene-6-sulphonic acid). The brown fibre then is treated with the solution of a diazo compound. 5-nitro-2-diazo-1-methoxybenzene for example furnishes a blackish brown, double-diazotized dianisidine a black olive.

Example 10.—Cotton is impregnated with a solution prepared from 6.6'-dihydroxy-1.2.2'.1'-dinaphthazine:

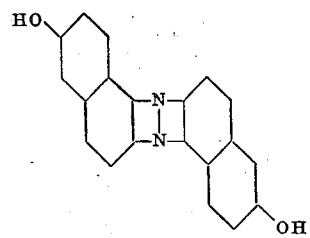

(obtainable by fusing 1.2-2'.1'-dinaphthazine-6.6'-disulphonic acid, see Berichte der Deutschen Chemischen Gesellschaft 33, 2717, with potassium hydroxide). By treatment of the fibre so prepared with a diazo compound of the benzene series brown red to red brown tints are obtained.

Example 11.—The fibre is padded with the hydroxy-compound which may be obtained by fusing with an alkali metal hydroxide 4-hydroxy-8-sulpho-1.2-naphtho-3- or 4-aminophenazine, corresponding to one of the following formulæ:

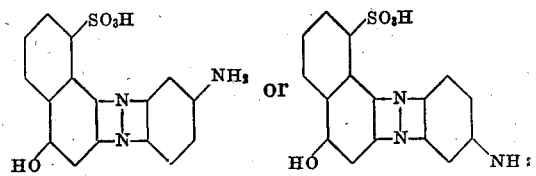

(obtainable by condensing 4-hydroxy-1.2-naphthoquinone-8-sulphonic acid with 4-nitro-1.2-diaminobenzene and subsequent reduction). By treating the fibre prepared with the orange solution of this compound with a diazo compound of the benzene series pure brown tints of remarkable fastness to acid and chlorine result.

Example 12.—Artificial silk is impregnated with an alkaline solution of the compound obtainable by fusing with an alkali metal hydroxide a 4-hydroxy-8-sulphodinaphthazine corresponding probably to one of the following formulæ:

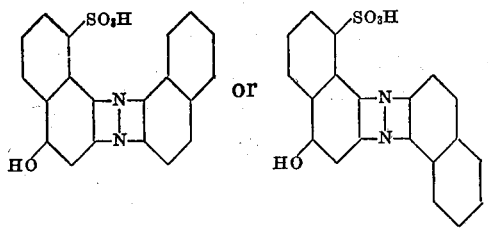

(resulting by condensation of 4-hydroxy-8-sulpho-1.2-naphthoquinone with 1.2-diaminonaphthalene). The prepared fibre is yellow red. It may be treated with a diazo solution containing sodium chloride without marked formation of dye in the bath itself. When 2-chlorodiazobenzene is used the fibre is dyed orange; 5-nitro-2-diazo-1-methoxybenzene yields a scarlet, and double-diazotized dianisidine a corinth. The dyeings are characterized by fastness to light, chlorine and washing.

*Example 13.*—The fibre is impregnated with a solution prepared from the hydroxy compound which may be obtained by fusing with an alkali metal hydroxide the condensation product of 1.2-naphthoquinone-8-sulphonic acid and 1.2-diaminonaphthalene-6-sulphonic acid, this condensation product being 6'.8-disulpho-1.2.1'.2'-dinaphthazine:

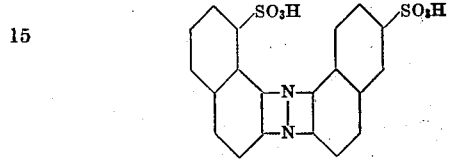

or 6'.8-disulpho-1.2.2'.1'-dinaphthazine:

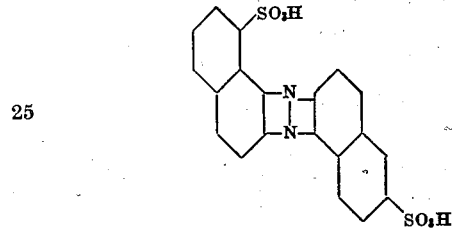

or mixtures of both compounds.

The fibre is then introduced into a developing bath containing a diazo compound. With 5-nitro-2-amino-1-methoxybenzene there is produced a beautiful fast Bordeaux dyeing.

In an analogous manner other hydroxy-para-diazine derivatives and also other diazo compounds may be used for wholly or locally producing dyeings on the fibre.

What we claim is:—

1. Process of producing dyeings consisting in treating the fibre in succession with an alkaline solution of a hydroxy-para-diazine derivative and a diazo compound, the hydroxy-para-diazine derivative being a substitution product of the para-diazine corresponding to the general formula:

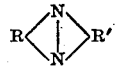

R and R' being radicles of the group including benzene and naphthalene.

2. Process of producing dyeings consisting in treating the fibre in succession with an alkaline solution of a hydroxy-para-diazine derivative and a diazo compound, substituted by a negative radical, the hydroxy-para-diazine derivative being a substitution product of the para-diazine corresponding to the general formula:

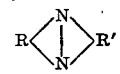

R and R' being radicles of the group including benzene and naphthalene.

3. Process of producing dyeings consisting in treating the fibre in succession with an alkaline solution of a hydroxy-para-diazine derivative and a nitrodiazo compound, the hydroxy-para-diazine derivative being a substitution product of the para-diazine corresponding to the general formula:

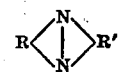

R and R' being radicles of the group including benzene and naphthalene.

4. Process of producing dyeings consisting in treating the fibre in succession with an alkaline solution of a reduced hydroxy-para-diazine derivative and a diazo compound, the hydroxy-para-diazine derivative being a substitution product of the para-diazine corresponding to the general formula:

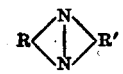

R and R' being radicles of the group including benzene and naphthalene.

5. Process of producing dyeings consisting in treating the fibre in succession with an alkaline solution of a reduced hydroxy-para-diazine derivative and a diazo compound substituted by a negative radical, the hydroxy-para-diazine derivative being a substitution product of the para-diazine corresponding to the general formula:

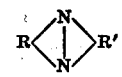

R and R' being radicles of the group including benzene and naphthalene.

6. Process of producing dyeings consisting in treating the fibre in succession with an alkaline solution of a reduced hydroxy-para-diazine derivative and a nitrodiazo compound, the hydroxy-para-diazine derivative being a substitution product of the para-diazine corresponding to the general formula:

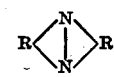

R and R' being radicles of the group including benzene and naphthalene.

7. Process of producing dyeings consisting in treating the fibre in succession with an alkaline solution of a hydroxy-para-diazine derivative and a diazo compound, the hydroxy-para-diazine derivative being a substitution product of the para-diazine corresponding to the general formula:

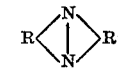

R being a naphthalene residue and R' an aryl group.

8. Process of producing dyeings consisting in treating the fibre in succession with an alkaline solution of a hydroxy-para-diazine derivative and a diazo compound, substituted by a negative radical, the hydroxy-para-diazine derivative being a substitution product of the para-diazine corresponding to the general formula:

R being a naphthalene residue and R' an aryl group.

9. Process of producing dyeings consisting in treating the fibre in succession with an alkaline solution of a hydroxy-para-diazine derivative and a nitrodiazo compound, the hydroxy-para-diazine derivative being a substitution product of the para-diazine corresponding to the general formula:

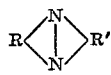

R being a naphthalene residue and R' an aryl group.

10. Process of producing dyeings consisting in treating the fibre in succession with an alkaline solution of a reduced hydroxy-para-diazine derivative and a diazo compound, the hydroxy-para-diazine derivative being a substitution product of the para-diazine corresponding to the general formula:

R being a napthalene residue and R' an aryl group.

11 Process of producing dyeings consisting in treating the fibre in succession with an alkaline solution of a reduced hydroxy-para-diazine derivative and a diazo compound substituted by a negative radical, the hydroxy-para-diazine derivative being a substitution product of the para-diazine corresponding to the general formula:

R being a naphthalene residue and R' an aryl group.

12. Process of producing dyeings consisting in treating the fibre in succession with an alkaline solution of a reduced hydroxy-para-diazine derivative and a nitro-diazo compound, the hydroxy-para-diazine derivative being a substitution product of the para-diazine corresponding to the general formula:

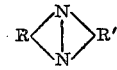

R being a naphthalene residue and R' an aryl group.

13. Process of producing dyeings consisting in treating the fibre in succession with an alkaline solution of a hydroxy-para-diazine derivative and a diazo compound, the hydroxy-para-diazine derivative being a substitution product of the para-diazine corresponding to the general formula:

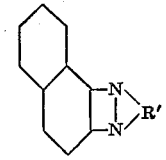

R' being an aryl group.

14. Process of producing dyeings consisting in treating the fibre in succession with an alkaline solution of a hydroxy-para-diazine derivative and a diazo compound substituted by a negative radical, the hydroxy-para-diazine derivative being a substitution product of the para-diazine corresponding to the general formula:

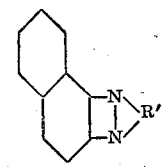

R' being an aryl group.

15. Process of producing dyeings consisting in treating the fibre in succession with an alkaline solution of a hydroxy-para-diazine derivative and a nitrodiazo compound, the hydroxy-para-diazine derivative being a substitution product of the para-diazine corresponding to the general formula:

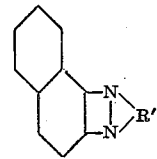

R' being an aryl group.

16. Process of producing dyeings consisting in treating the fibre in succession with an alkaline solution of a reduced hydroxy-para-diazine derivative and a diazo compound, the hydroxy-para-diazine derivative being a substitution product of the para-diazine corresponding to the general formula:

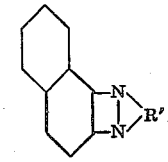

R' being an aryl group.

17. Process of producing dyeings consisting in treating the fibre in succession with an alkaline solution of a reduced hydroxy-para-diazine derivative and a diazo compound substituted by a negative radical, the hydroxy-para-diazine derivative being a substitution product of the para-diazine corresponding to the general formula:

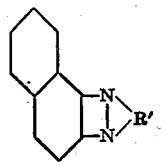

R' being an aryl group.

18. Process of producing dyeings consisting in treating the fibre in succession with an alkaline solution of a reduced hydroxy-para-diazine derivative and a nitrodiazo compound, the hydroxy-para-diazine derivative being a substitution product of the para-diazine corresponding to the general formula:

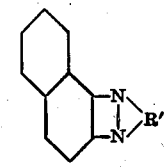

R' being an aryl group.

19. Process of producing dyeings consisting in treating the fibre in succession with an alkaline solution of a hydroxy-para-diazine derivative and a diazo compound, the hydroxy-para-diazine derivative being obtainable by fusing with an alkali metal hydroxide a substitution product of the para-diazine sulphonic acid corresponding to the general formula:

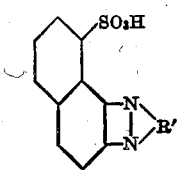

R' being an aryl group.

20. Process of producing dyeings consisting in treating the fibre in succession with an alkaline solution of a hydroxy-para-diazine derivative and a diazo compound substituted by a negative radical, the hydroxy-para-diazine derivative being obtainable by fusing with an alkali metal hydroxide a substitution product of the para-diazine sulphonic acid corresponding to the general formula:

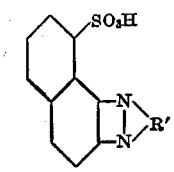

R' being an aryl group.

21. Process of producing dyeings consisting in treating the fibre in succession with an alkaline solution of a hydroxy-para-diazine derivative and a nitrodiazo compound, the hydroxy-para-diazine derivative being obtainable by fusing with an alkali metal hydroxide a substitution product of the para-diazine sulphonic acid corresponding to the general formula:

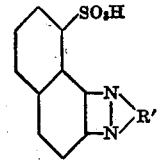

R' being an aryl group.

22. Process of producing dyeings consisting in treating the fibre in succession with an alkaline solution of a reduced hydroxy-para-diazine derivative and a diazo compound, the hydroxy-para-diazine derivative being obtainable by fusing with an alkali metal hydroxide a substitution product of the para-diazine sulphonic acid corresponding to the general formula:

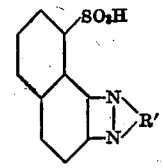

R' being an aryl group.

23. Process of producing dyeings consisting in treating the fibre in succession with an alkaline solution of a reduced hydroxy-para-diazine derivative and a diazo compound substituted by a negative radical, the hydroxy-para-diazine derivative being obtainable by fusing with an alkali metal hydroxide a substitution product of the para-diazine sulphonic acid corresponding to the general formula:

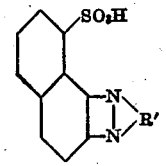

R' being an aryl group.

24. Process of producing dyeings consisting in treating the fibre in succession with an alkaline solution of a reduced hydroxy-para-diazine derivative and a nitrodiazo compound, the hydroxy-para-diazine derivative being obtainable by fusing with an alkali metal hydroxide a substitution product of the para-diazine sulphonic acid corresponding to the general formula:

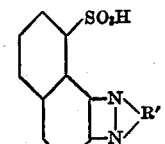

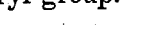

R' being an aryl group.

25. Process of producing dyeings consisting in treating the fibre in succession with an alkaline solution of a hydroxy-para-diazine derivative and a diazo compound, the hydroxy-para-diazine derivative being a substitution product of the 1.2 naphthophenazine corresponding to the formula:

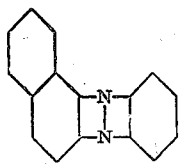

26. Process of producing dyeings consisting in treating the fibre in succession with an alkaline solution of a hydroxy-para-diazine derivative and a diazo compound, substituted by a negative radical, the hydroxy-para-diazine derivative being a substitution product of the 1.2-naphthophenazine corresponding to the formula.

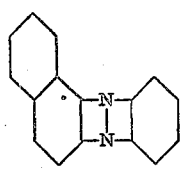

27. Process of producing dyeings consisting in treating the fibre in succession with an alkaline solution of a hydroxy-para-diazine derivative and a nitrodiazo compound, the hydroxy-para-diazine derivative being a substitution product of the 1.2-naphthophenazine corresponding to the formula:

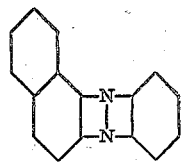

28. A process of producing dyeings consisting in treating the fibre in succession with an alkaline solution of a reduced hydroxy-para-diazine derivative and a diazo compound, the hydroxy-para-diazine derivative being a substitution product of the 1.2-naphthophenazine corresponding to the formula.

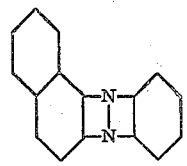

29. Process of producing dyeings consisting in treating the fibre in succession with an alkaline solution of a reduced hydroxy-para-diazine derivative and an diazo compound, substituted by a negative radical, the hydroxy-para-diazine derivative being a substitution product of the 1.2-naphthophenazine corresponding to the formula:

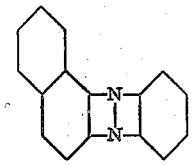

30. Process of producing dyeings consisting in treating the fibre in succession with an alkaline solution of a reduced hydroxy-para-diazine derivative and a nitrodiazo compound, the hydroxy-para-diazine derivative being a substitution product of the 1.2-naphthophenazine corresponding to the formula:

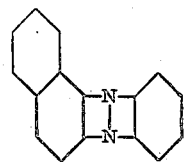

31. Process of producing dyeings consisting in treating the fibre in succession with an alkaline solution of a hydroxy-para-diazine derivative and a diazo compound, the hydroxy-para-diazine derivative being obtainable by fusing with an alkali metal hydroxide a substitution product of the 8-sulpho-1.2-naphthophenazine corresponding to the formula:

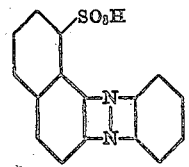

32. Process of producing dyeings consisting in treating fibre in succession with an alkaline solution of a hydroxy-para-diazine derivative and a diazo compound substituted by a negative radical, the hydroxy-para-diazine derivative being obtainable by fusing with an alkali metal hydroxide a substitution product of the 8-sulpho-1.2-naphthophenazine corresponding to the formula:

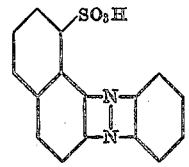

33. Process of producing dyeings consisting in treating the fibre in succession with an alkaline solution of a hydroxy-para-diazine derivative and a nitrodiazo compound, the hydroxy-para-diazine derivative being obtainable by fusing with an alkali metal hydroxide a substitution product of the 8-sulpho-1.2-naphthophenazine corresponding to the formula:

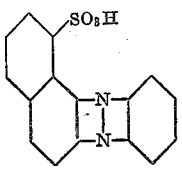

34. Process of producing dyeings consisting in treating the fibre in succession with an alkaline solution of a reduced hydroxy-para-diazine derivative and a diazo compound, the hydroxy-para-diazine derivative being obtainable by fusing with an alkali metal hydroxide a substitution product of the 8-sulpho-1.2-naphthophenazine corresponding to the formula:

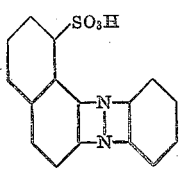

35. Process of producing dyeings consisting in treating the fibre in succession with an alkaline solution of a reduced hydroxy-para-diazine derivative and a diazo compound substituted by a negative radical, the hydroxy-para-diazine derivative being obtainable by fusing with an alkali metal hydroxide a substitution product of the 8-sulpho-1.2-naphthophenazine corresponding to the formula:

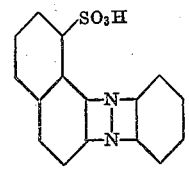

36. Process of producing dyeings consisting in treating the fibre in succession with an alkaline solution of a reduced hydroxy-para-diazine derivative and a nitrodiazo compound, the hydroxy-para-diazine derivative being obtainable by fusing with an alkali metal hydroxide a substitution product of the 8-sulpho-1.2-naphthophenazine corresponding to the formula:

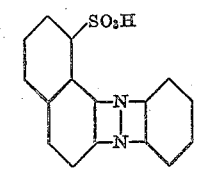

In testimony whereof we affix our signatures.

WILHELM HERZBERG.
HEINRICH OHLENDORF.